(12) United States Patent
Dolan et al.

(10) Patent No.: US 7,218,778 B2
(45) Date of Patent: May 15, 2007

(54) METHODS AND SYSTEM FOR SECTIONALIZED COMPLEXITY-BASED PROCESS SELECTION

(75) Inventors: John Edward Dolan, Vancouver, WA (US); Toyohisa Matsuda, Vancouver, WA (US); Ahmet Mufit Ferman, Vancouver, WA (US); Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 364 days.

(21) Appl. No.: 10/993,875

(22) Filed: Nov. 19, 2004

(65) Prior Publication Data

US 2006/0002622 A1    Jan. 5, 2006

Related U.S. Application Data

(63) Continuation of application No. 10/882,478, filed on Jun. 30, 2004.

(51) Int. Cl.
*G06K 9/34* (2006.01)
*G06K 9/40* (2006.01)
*G06K 9/36* (2006.01)
*G06K 1/00* (2006.01)

(52) U.S. Cl. .................... 382/173; 382/286; 382/254

(58) Field of Classification Search ............... 382/286, 382/171, 173, 174, 176, 180, 190, 203, 204, 382/254; 358/1.1, 1.9, 1.16, 1.17, 1.18
See application file for complete search history.

(56) References Cited

U.S. PATENT DOCUMENTS

| | | | |
|---|---|---|---|
| 5,216,754 A | 6/1993 | Sathi et al. | |
| 5,524,186 A | 6/1996 | Campbell | |
| 5,930,469 A | 7/1999 | Chiarabini et al. | |
| 5,937,233 A | 8/1999 | Nakata et al. | |
| 6,028,676 A | 2/2000 | Nakao | |
| 6,574,003 B1 | 6/2003 | Kakuno | |
| 2002/0093669 A1* | 7/2002 | Campbell et al. | 358/1.9 |
| 2002/0196467 A1* | 12/2002 | Delhoune et al. | 358/1.18 |
| 2003/0086619 A1 | 5/2003 | Nagaisha | |
| 2003/0231330 A1* | 12/2003 | Westervelt et al. | 358/1.13 |

\* cited by examiner

*Primary Examiner*—Yon J. Couso
(74) *Attorney, Agent, or Firm*—Krieger Intellectual Property, Inc.; Scott C. Krieger

(57) ABSTRACT

Embodiments of the present invention comprise methods and systems for image complexity estimation and selective complexity-based image processing.

15 Claims, 14 Drawing Sheets

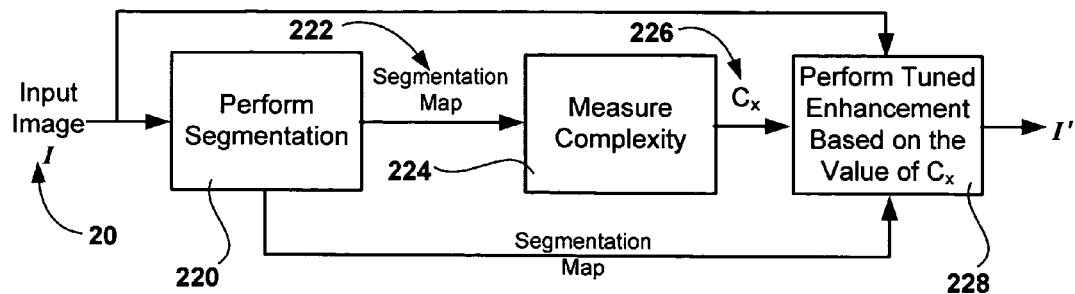
FIG. 13
| Complexity Value | Filter |
|---|---|
| $0 > C_x > 0.25$ | $F_1$ |
| $0.26 > C_x > 0.50$ | $F_2$ |
| $0.51 > C_x > 0.75$ | $F_3$ |
| $0.76 > C_x > 0.85$ | $F_4$ |
| $C_x > 0.85$ | $F_5$ |
FIG. 14
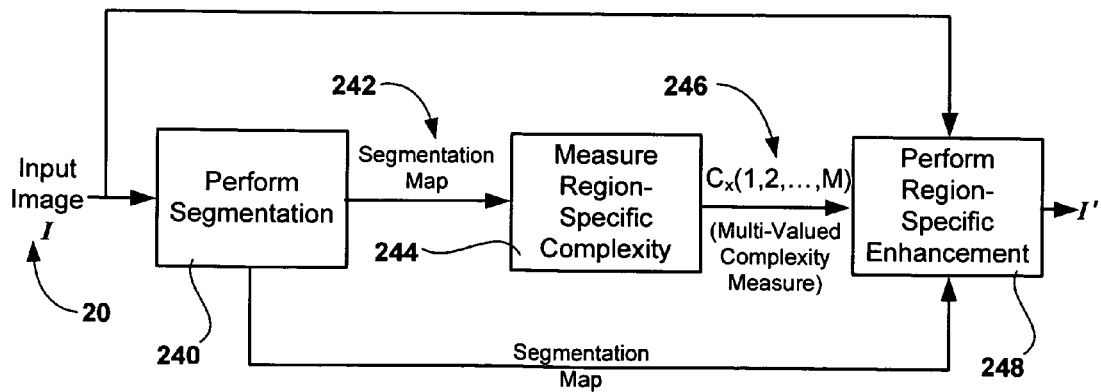
FIG. 15

METHODS AND SYSTEM FOR SECTIONALIZED COMPLEXITY-BASED PROCESS SELECTION

CROSS-REFERENCE TO RELATED APPLICATIONS

This application is a continuation of U.S. patent application Ser. No. 10/882,478, entitled "Methods and Systems for Complexity Estimation and Complexity-Based Selection," invented by John Dolan, Toyohisa Matsuda, Ahmet Mufit Ferman & Richard Campbell, filed on Jun. 30, 2004.

BACKGROUND OF THE INVENTION

Digital images and documents may contain many elements or content types including text, halftone, graphics, bitmap images, variations thereof and other elements. When rendered to a display or a printer, each of these elements may be processed in a different way to optimize the quality of the presented output. This differential processing requires that the image be segmented into elements or content types. This is typically performed by computing a so-called segmentation map from a digital image of a document page. Often this reduces to a problem of pixel or region classification, since the set of element types or content types is known a priori. Given the segmentation map of an input page, each content type region can then be optimally processed according to the requirements of its corresponding elements or content type.

In some known methods, as shown in FIG. 1, object data for a rendering job is received 10. This data 10 is typically in the form of printer job language commands or graphics engine rendering commands such as HPGL commands, PCL commands, GDI commands or others. These commands identify the content type for the graphic elements they define and this information can be easily extracted from the command data 10 to identify 12 the content types in the document. Once the content types are identified 12, the configuration of the objects can be analyzed 14 to help evaluate document complexity. A complexity factor is calculated 16 from this data. While these techniques work well for document data that is compartmentalized into command structures, such as object-based commands, it is of no use on bitmap data, raster data and other forms of non-object-based data. Additionally, the available methods have not been combined with processing algorithm data to create an algorithm-related complexity factor.

BRIEF SUMMARY OF THE INVENTION

Embodiments of the present invention comprise systems and methods for estimating document image complexity and using the complexity estimation as a basis for image processing decisions such as selecting a process.

The objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 13 is a diagram showing embodiments of the present invention that determine complexity measures and use these measures as a gain control on enhancement processes;

FIG. 14 is a table showing a multiple filter configuration method;

FIG. 15 is a diagram showing embodiments of the present invention that determine region-specific complexity measures;

DETAILED DESCRIPTION OF PREFERRED EMBODIMENTS

The described embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the exemplary embodiments of the invention.

Many of the embodiments described in this description are examples from the field of copying and reprographics, where segmentation is used to improve image quality through optimized, selective enhancement of page elements. However, these are only exemplary embodiments that should in no way limit the scope of the present invention from extending to other domains that exploit segmentation-guided processing, such as compression, archiving, retrieval and others.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Little, if any, attention has been given to the problem of determining when a segmentation procedure is appropriate or not—in other words, determining the reliability and/or the cost-effectiveness of the segmentation.

Embodiments of the present invention address the problem of computing the reliability and/or benefit of segmentation algorithms and the problem of adjusting the ensuing processing accordingly. Some of these embodiments may explicitly identify cases in which the segmentation procedure is either highly error prone or too costly to complete.

Figure 1:
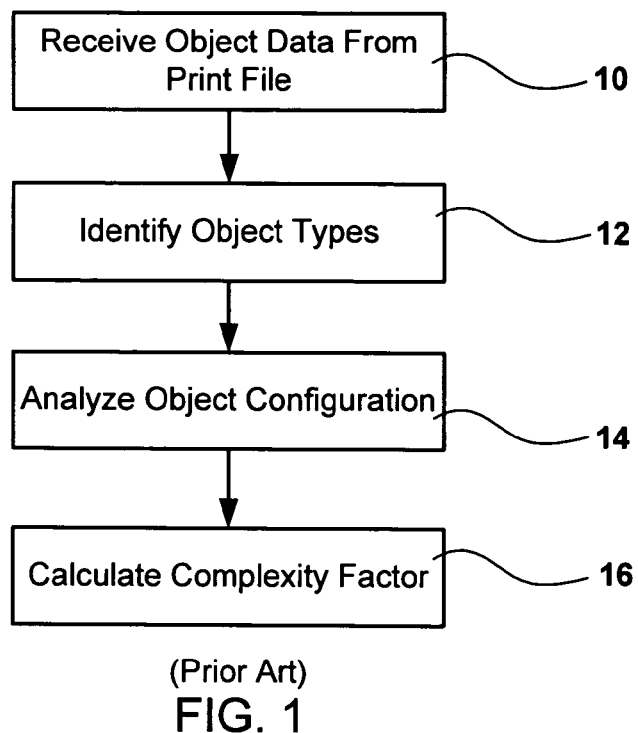
FIG. 1 is a chart showing prior art complexity calculation methods.
Figure 2:
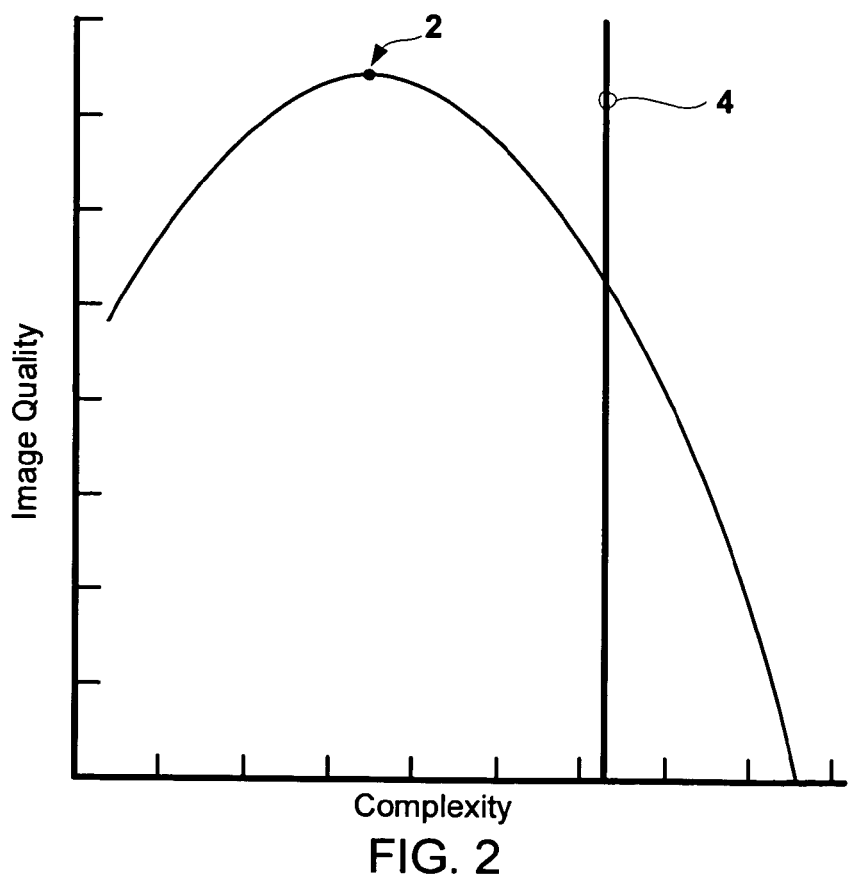
FIG. 2 is a graph showing the effect on image quality of segmentation-based enhancement as image complexity increases.

In the field of printing and reprographics and many other applications, the image quality benefit of segmentation attains a maximum for moderately complex documents. As illustrated in FIG. 2, the benefit increases as page layout complexity increases only up to some point 2. It thereafter decreases due to an increased probability of segmentation errors and the increased difficulty of the segmentation task itself. More significantly such errors often lead to noticeable artifacts in the output page that can negate any benefit derived from the segmentation.

In FIG. 2, the approximate point at which the benefit of segmented enhancement dips below that of "unsegmented" or global enhancement is indicated by the intersection of the image quality curve and a vertical line 4. This point depends both on the complexity of the page layout and the exact nature of the segmentation algorithms. Typically, this point is determined experimentally.

In order to limit segmentation to only beneficial cases or to adjust segmentation for more optimal processing, embodiments of the present invention may compute a measure of page layout complexity. Such a measure may determine the overall complexity of a document page, which may include page layout.

The terms "page complexity," "page layout complexity" and "image complexity" are used synonymously throughout the specification and claims of this application. All these terms refer to the quantity, size, geometric relationship and other attributes of document elements or content types such as areas of text, graphics, halftone elements, bitmap elements and other elements.

A complexity measure may also take into account the error likelihoods of alternative processing techniques, such as segmentation algorithms or sets of possible algorithms. Once determined, this measure may be used to determine whether or not a processing step, such as segmentation should be applied in subsequent enhancement processing, thereby avoiding enhancement artifacts. Complexity measures may also be used to determine the type or extent of processing, including but not limited to segmentation, used for a particular application.

The term "content region" or "region" may refer to an area or group of areas that contain a single content type. For example, a halftone region may contain all of the halftone elements of an image, which may be scattered across several contiguous or non-contiguous areas.

The terms "raster data," "bitmap data," and "pixel data," as used in the specification and claims of this document, refer to document or image data that define a document or image relative to basic picture elements or pixels. These terms and the more generic term, "non-object-based" may be used to refer to image or document data that relates directly to basic image pixels rather than objects that contain a plurality of pixels in a pre-defined configuration. Non-object-based data comprise streaming data and transform domain data, such as transform coefficients, that are related to pixel-based images or documents. Printer job language commands and graphics engine rendering language commands are typically object-based data.

The effectiveness of image processing techniques, such as page segmentation, depends both on the complexity of the page and its layout and the exact nature of the processing (i.e., segmentation) algorithm. Factors may include resource costs in terms of time and memory, and the success/failure rate of the classification task itself. However, in the case of segmentation, the benefit of segmentation tends to decrease after a certain level of layout complexity is reached, regardless of the particular algorithm. This may occur simply because the classification task itself becomes increasingly difficult. This may also occur when segmentation area boundaries become so numerous that boundary artifacts significantly degrade image quality. Regardless of the reasons for the diminishing returns, the benefits of segmentation begin to decrease as page or page layout complexity increases beyond a certain level.

Thus for a given process, such as a segmentation algorithm or group of algorithms, it is possible to determine, in terms of page layout complexity, when application of the particular algorithm or group will be beneficial and when it will not improve image quality.

Figure 3:
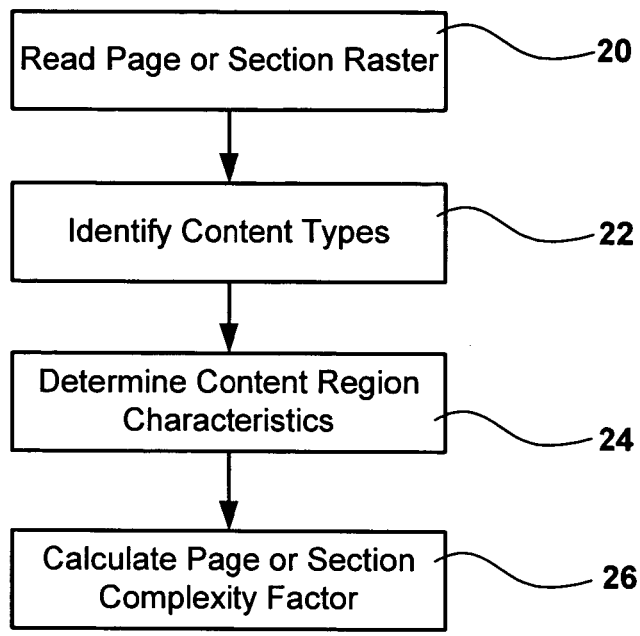
FIG. 3 is a chart showing a raster-based complexity determination method of embodiments of the present invention.

Some embodiments of the present invention may be explained with reference to FIG. 3. In these embodiments, non-object-based (NOB) raster data for a page or section is received and read 20. This raster NOB data is then analyzed to identify content types 22 or a likelihood that content types exist in the page or section. Various content types may affect the final complexity factor in different ways. In this step, each type or a likelihood of its existence is identified 22. As content types are identified, elements of each type may be associated with areas of the image and the accumulated areas for a specific content type may be organized into a content type region 24. Characteristics of each content type region may be determined by analysis of these regions. A complexity factor may then be calculated 26 based on region characteristics as well as other data.

A complexity factor will typically relate to content type region characteristics, such as region size, shape, quantity, density, regional geometry, region contiguity and other region characteristics. A complexity factor may also relate to other page, section or image characteristics as well as characteristics of a process to be selected or controlled with reference to the complexity factor. Complexity factors that are calculated from raster data may be referred to as raster-related complexity factors.

Figure 4:
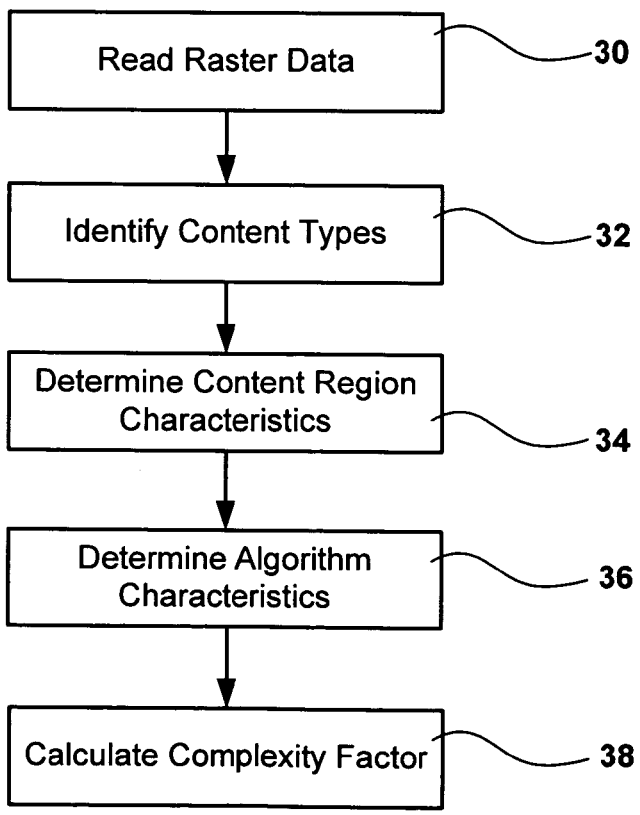
FIG. 4 is a chart showing a raster-based complexity determination method of embodiments of the present invention wherein algorithm characteristics are employed.

In some embodiments, a complexity factor may relate to a process or algorithm on which the complexity factor will have an effect. Some of these embodiments are illustrated in FIG. 4. In these embodiments, raster page or section data is read 30 and content types are identified 32. Content regions are identified and region characteristics are determined 34. Characteristics of an algorithm or process that will be affected by the complexity factor may also be determined 36 and used in the complexity factor calculus. These algorithm characteristics may comprise the reliability of a specific algorithm in relation to a content type or types, or other data. Once algorithm and region characteristics are determined, an algorithm-related complexity factor can be calculated 38.

Figure 5:
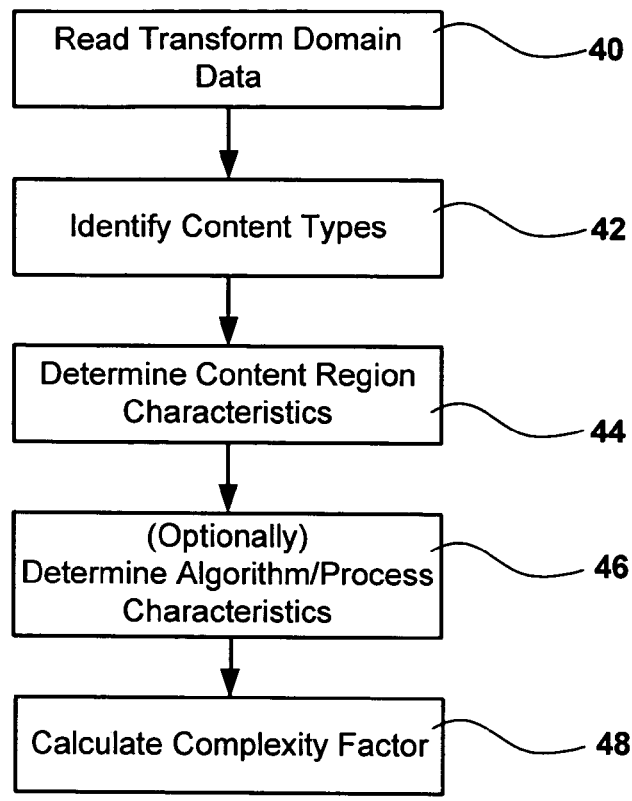
FIG. 5 is a chart showing a raster-based complexity determination method of embodiments of the present invention wherein transform domain data is employed.

In some embodiments of the present invention, as illustrated in FIG. 5, a complexity factor may be calculated in relation to transform domain data. Transform domain data may comprise transform coefficients or related data. A transform commonly used in image processing is the Discrete Cosine Transform (DCT), however many other transforms may be used in embodiments of the present invention.

In these embodiments the transform domain data is read 40 and used to identify content types 42. Content type regions are then constructed and region characteristics are determined 44. In some embodiments, an optional step of determining algorithm or process characteristics may be performed 46. Once their characteristics are determined, they may be used to calculate a complexity factor 48. This complexity factor may be an algorithm-related complexity factor. Complexity factors that are calculated with transform domain data may be referred to as transform-data-related complexity factors.

Figure 6:
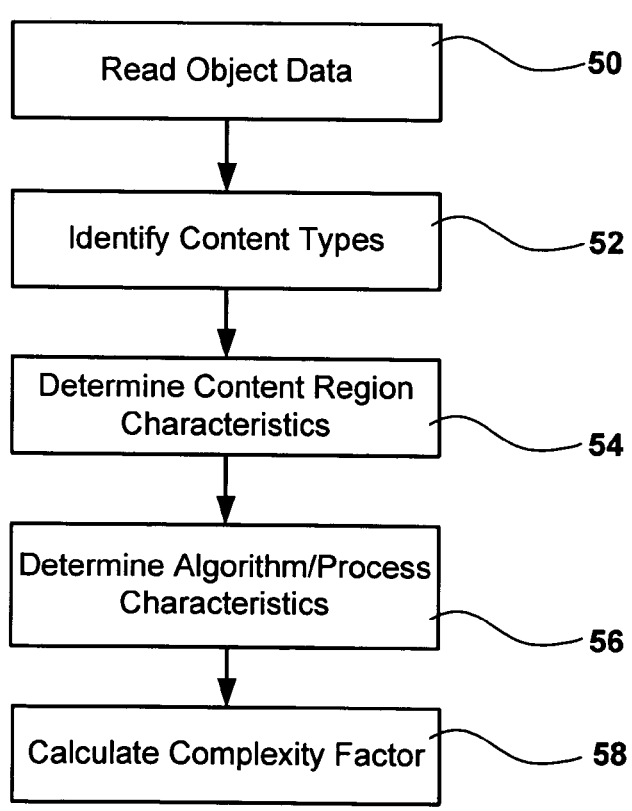
FIG. 6 is a chart showing an object-based complexity determination method of embodiments of the present invention wherein algorithm characteristics are employed.

In some embodiments of the present invention, as illustrated in FIG. 6, rendering stream object data may be read 50 and used to identify content types 52 as is done in some known methods. This object data may be used to determine content region characteristics 54. Characteristics of an algorithm or process to be affected by the complexity factor may also be determined 56. A complexity factor that is dependent on both the image complexity and the algorithm or process may then be calculated 58. A complexity factor that is related to both the image complexity and the effect of image complexity on the result of an algorithm or process may be referred to as process-effect complexity factor.

Figure 7:
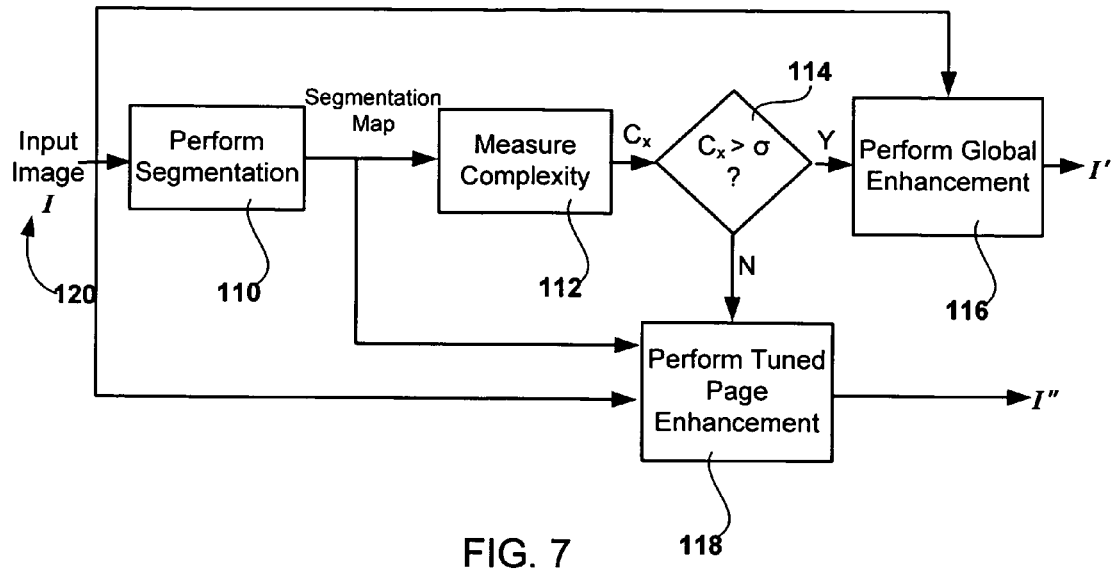
FIG. 7 is a diagram showing embodiments of the present invention that determine segmentation-based complexity measures and use these measures to control image enhancement.

Some embodiments of the present invention may be described in relation to FIG. 7. The input document image 120 is segmented 110 into its constituent regions, and, in some embodiments, a segmentation map that identifies the content type or types for each pixel is generated. This map is subsequently used to measure the complexity 112 of the document, taking into account the layout projected by the segmentation map. In some embodiments, the properties of the particular segmentation method that may be employed can have an effect on the complexity estimation. The resulting complexity value Cx 114 provides an estimate of how reliable the segmentation map is, and how appropriate a segmentation-based, region-specific enhancement approach would be for the input document. In some embodiments, if Cx 114 exceeds a predetermined threshold, the segmentation map is discarded, and a standard global enhancement 116 is applied to the document to avoid potential artifacts in the output image. Otherwise, the document is enhanced 118 based on the segmentation map, enabling an optimized process to be performed on each content type.

Figure 8:
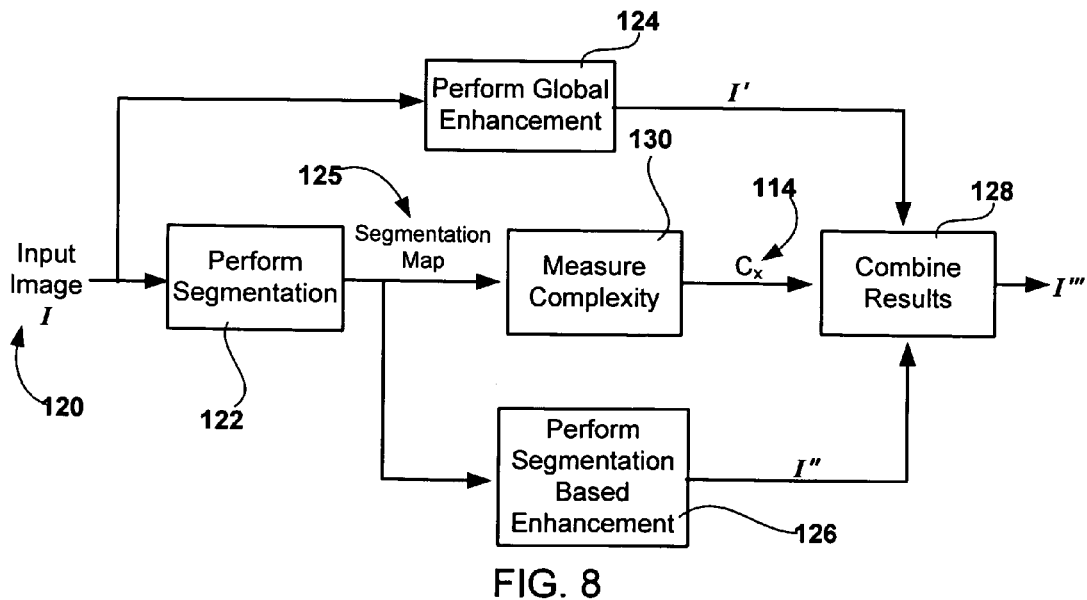
FIG. 8 is a diagram showing embodiments of the present invention that determine segmentation-based complexity measures and use these measures to control image enhancement and to control a combination of global and segmentation-based enhancement.

Some embodiments of the present invention may be described in relation to FIG. 8, which illustrates exemplary embodiments comprising complexity measures that can be utilized for segmentation-based document enhancement. In these embodiments, segmentation-based enhancement 126 and global enhancement 124 can be performed independently. The results may then be combined 28 based on the computed complexity 114 of the document. Typically, an input image 120 is processed using a segmentation algorithm 122 thereby creating a segmentation map 125. This map 125, may be used to perform segmentation-based enhancement. Input image 120 may also be processed directly by performing global enhancement 124. These enhancement processes may take place in parallel, series or otherwise.

After map 125 is created, the complexity of the image 120 is measured 130 and a complexity value 114 is calculated. When document complexity is low, segmentation-based enhancement 126 may be weighed more heavily, whereas global enhancement 124 may be given more emphasis for a complex document. The two enhancements may be combined 128 in various ways. For example, a simple linear combination method, such as $$(1-C_x) \cdot \text{SegEnh} + C_x \cdot \text{GlobalEnh}$$

can be employed when the complexity measure is a scalar. Here SegEnh and GlobalEnh denote segmentation-based enhancement 126 and global enhancement 124, respectively. Alternatively, the combination rules may be region-driven; i.e. they may be based on the performance of the segmentation and enhancement algorithms for detection and improvement of various types of content. If the complexity of the document is defined on a region-by-region basis rather than the entire page, regional, global or default enhancement methods may be preferred in areas where segmentation confidence is low.

Figure 9A:
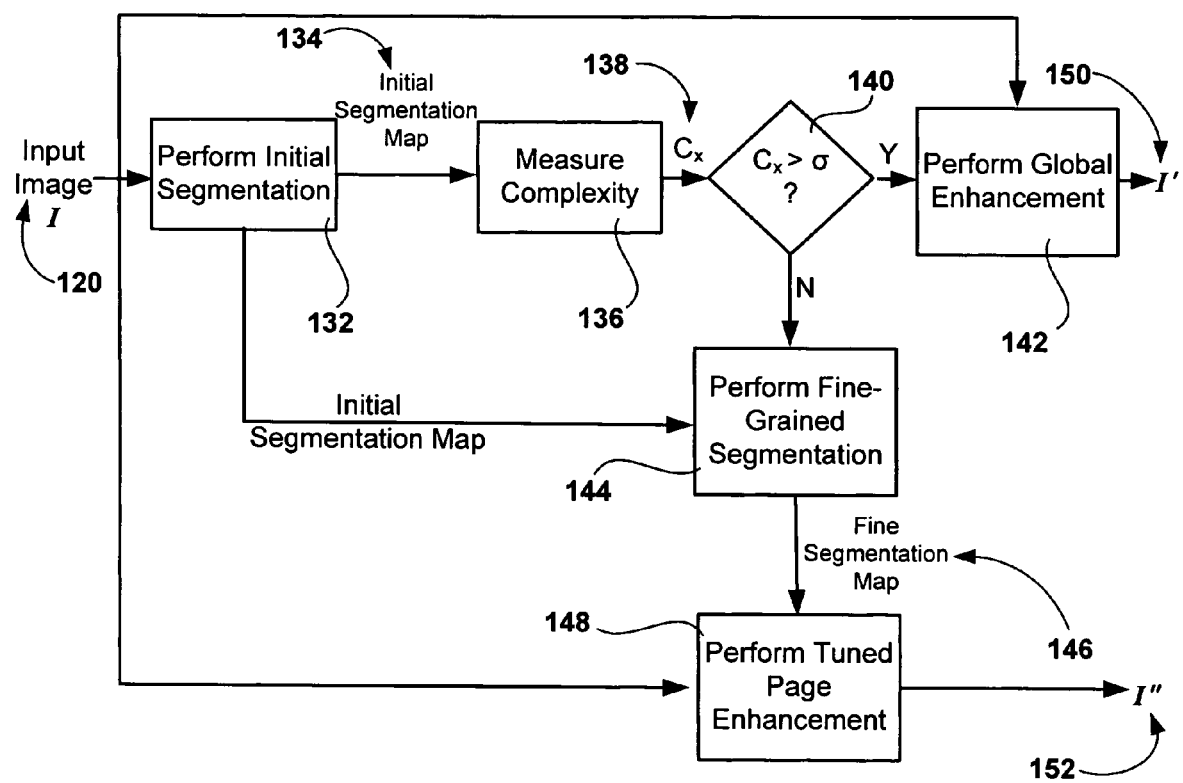
FIG. 9A is a diagram showing embodiments of the present invention that use coarse segmentation to determine complexity measures and later perform a more refined segmentation if needed.

In further embodiments, illustrated in FIG. 9A, an additional segmentation modification may be used. In these embodiments an additional segmentation refinement step is used when the complexity of the document is found to be below a predetermined threshold, σ or found to meet some other criterion. This approach allows a coarse initial segmentation map to be generated first and used for complexity analysis, thereby reducing the computational requirements of the implementation. In these embodiments an input image 120 is processed. Initial segmentation is performed 132 and an initial segmentation map 134 is created. As in other embodiments, the complexity of the image is measured 136 and a complexity value 138 is calculated. When the complexity value 138 is greater than a threshold value 140, or the complexity value meets some other criterion, global enhancement 142 may be performed yielding a globally enhanced image 150. When the complexity value 138 is less than the threshold value 140, or meets some other criterion, a finer segmentation process may be performed 144 and a refined segmentation map 146 may be created.

The initial segmentation map 135 may be passed to the refined segmentation processor for use in the refined process. In alternative embodiments, the initial map may not be used and an independent refined segmentation process may be performed.

The image 120 may then be enhanced using a segmentation-based enhancement 148 based on the refined map 146. This part of the process will yield an image 152 enhanced by a refined segmentation-based enhancement.

Figure 9B:
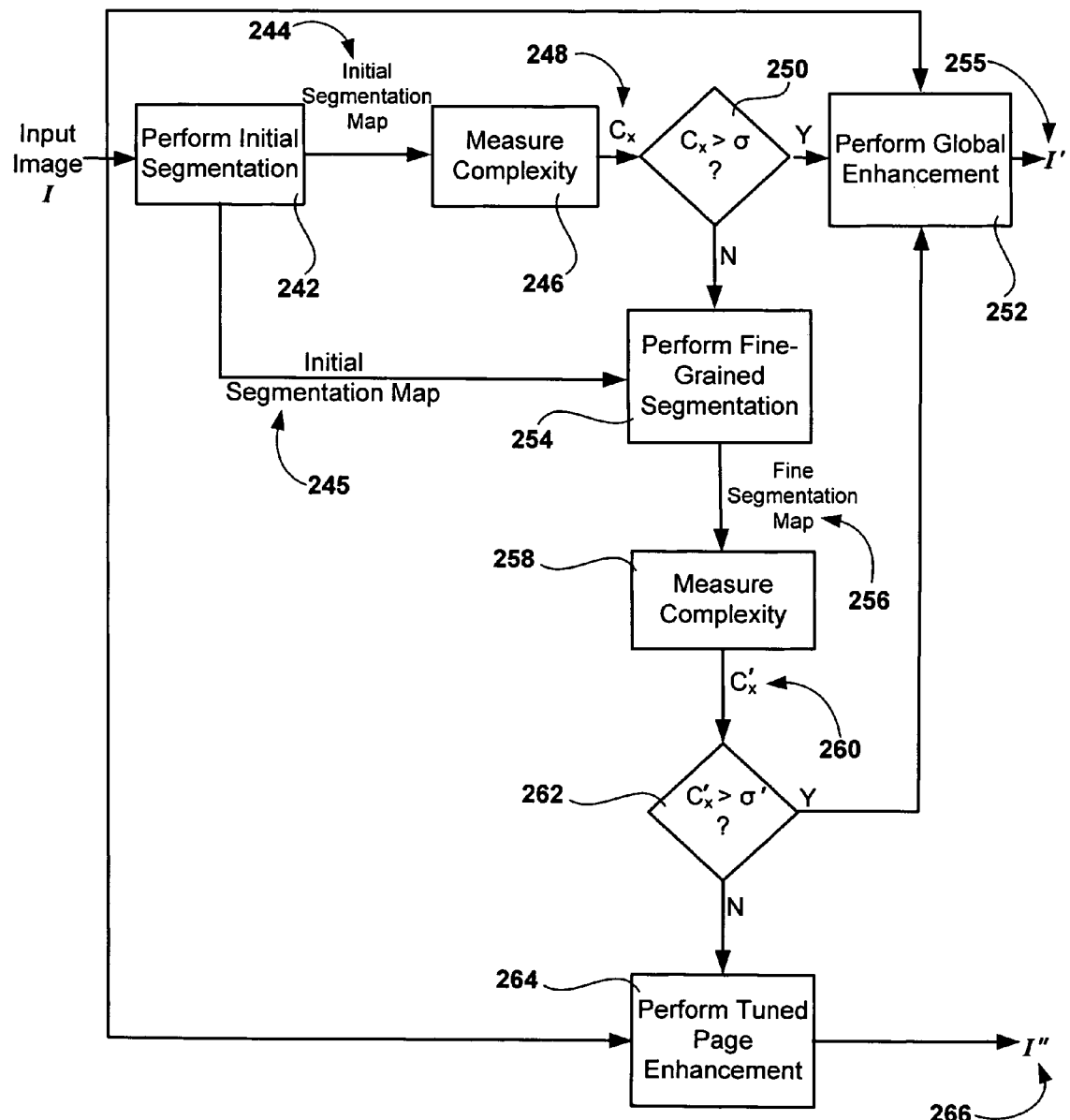
FIG. 9B is a diagram showing embodiments of the present invention that use coarse segmentation to determine complexity measures and later perform a more refined segmentation and a refined complexity determination if needed.

In some embodiments of the present invention, as illustrated in FIG. 9B, an alternative, refined segmentation approach may be used. In these embodiments, an input image 120 is processed and initial segmentation is performed 242 yielding an initial segmentation map 244. This initial map 244 is used to measure 246 the complexity of the image 120. A complexity value 250 is determined by this process. If the complexity value meets a given criterion, global enhancement 252 is performed and a globally enhanced image 251 results. If that criterion is not met or an alternative criterion is met, a finer segmentation process 254 may be performed. This process may use the initial segmentation map 245 as a basis for its refined process or may perform a finer segmentation process 254 independent of the initial segmentation process 242. This finer segmentation process 254 may result in a finer segmentation map 256.

Once the refined map 256 has been generated, the image complexity may again be measured 258 based on the refined map 256 and a refined complexity value 260 may be determined. If this refined complexity value meets a criterion 262, such as exceeding a threshold value, a global enhancement 252 may be performed. If that criterion is not met or an alternative criterion is met, an alternative enhancement process 264 may be performed thereby yielding an enhanced image 266.

Figure 10:
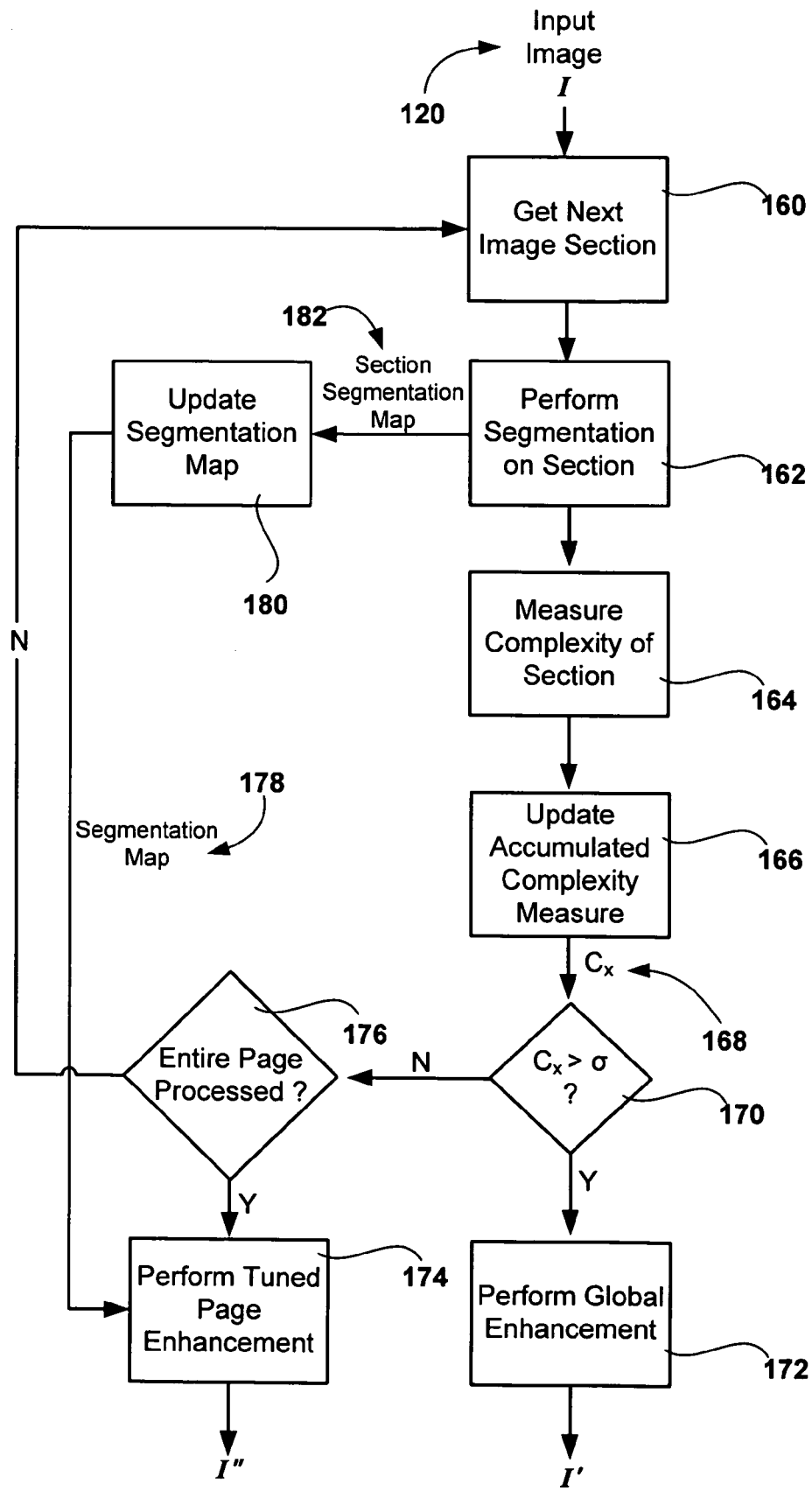
FIG. 10 is a diagram showing embodiments of the present invention that determine segmentation-based complexity measures for successive image sections and employ a cumulative complexity measure to control image enhancement.

In the previously-described embodiments of the present invention, the complexity measure may be computed using the segmentation map of the entire document image. In alternative embodiments, described with reference to FIG. 10, the complexity measure may be calculated and updated or accumulated progressively using image sections or strips. For the purposes of this specification and claims, the term section is used to refer to any sub-division or portion of a document, document image or image. A section may be formed by dividing the image geometrically, by color characteristics, by transform values or by some other method. The term "strip" refers to an elongate geometric portion of an image, typically extending from one end or side of a page to an opposite end or side. The term "strip" is comprised within the meaning of the broader term "section." In these embodiments, an input image 120 is processed incrementally by section or strip. This can be an iterative process in which a first section is analyzed 60 and segmentation is performed 162 thereon. Once segmentation has been performed on one section, a cumulative section segmentation map 182 is created. The complexity of the image section is also calculated 64 and a complexity value or measure 168 is established 166. If the complexity value 168 exceeds 170 a threshold value, the segmentation process is terminated and global enhancement is performed 172.

If the complexity value 168 is less than 170 a threshold value, another image section is processed 160. When subsequent sections are analyzed, the segmentation map is updated 180 and a complexity measure is calculated 64 for that section. An accumulated complexity measure 168 is also updated 166 to reflect information gathered in the new section. If the accumulated complexity value 168 exceeds 170 the threshold value, global enhancement 172 is performed. If the accumulated complexity value 168 remains below the threshold value, another section is processed 160.

This process may continue until the complexity measure 168 exceeds the threshold value or until the entire page is processed 176. If the entire page is processed 176 without exceeding the threshold value, the entire image is processed using a tuned, segmentation-based enhancement 1714. In some embodiments, non-overlapping image strips which comprise n rows, with $n \geq 1$ may be used.

Figure 11:
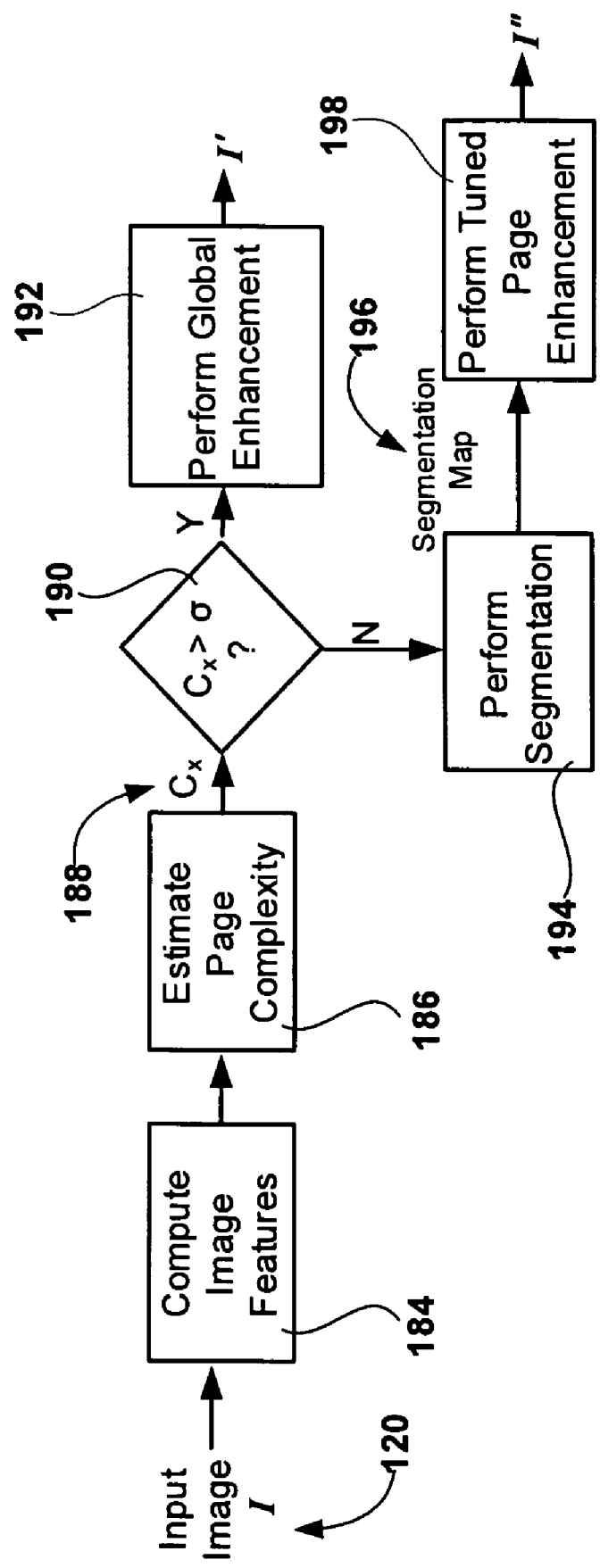
FIG. 11 is a diagram showing embodiments of the present invention that determine complexity measures from page-related features without a need for segmentation during complexity determination.

In further embodiments of the present invention, shown in FIG. 11, page complexity may be determined without an explicit segmentation map. In these embodiments, other image or page features directly extracted from the input document, such as, but not limited to, histogram analysis and transform domain processing may be utilized to estimate the complexity of the document. This initial analysis and complexity estimate is subsequently employed to determine whether it is worthwhile to generate a segmentation map and perform tuned enhancement on the document. In these embodiments an input image 120 is processed and analyzed to compute image or page features 184. Page complexity is estimated 186 based on these features and a complexity value or measure 188 is calculated. When the complexity measure 188 exceeds a threshold value 190, global enhancement 192 is performed. When the complexity measure is less than the threshold value, segmentation is performed 194 and a segmentation map is created 196. The image is then enhanced 198 based on the segmentation map.

Figure 12:
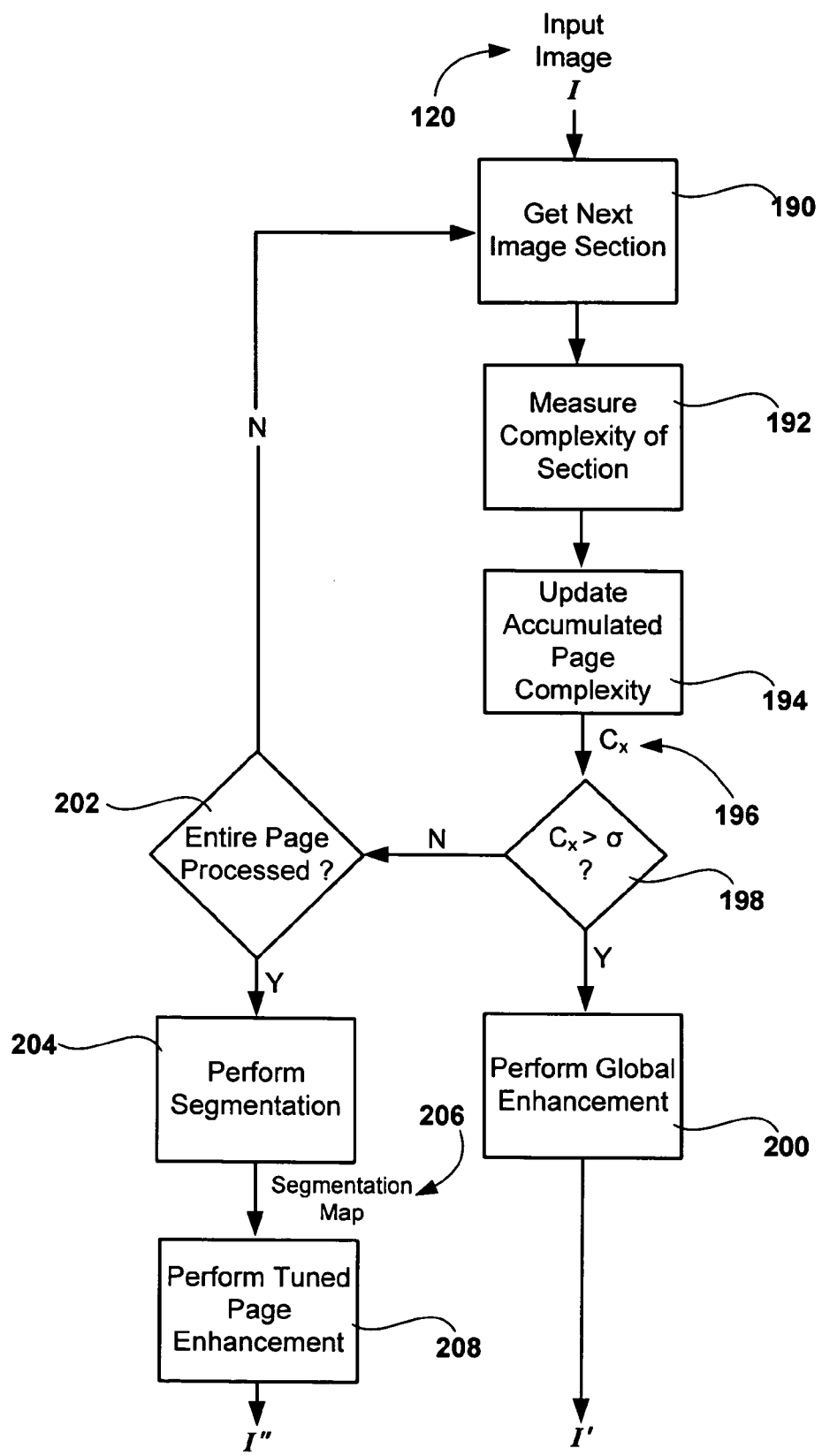
FIG. 12 is a diagram showing embodiments of the present invention that determine complexity measures from page-related features without a need for segmentation during complexity determination and which calculate complexity using successive image sections.

Further embodiments of the present invention may be explained with reference to FIG. 12. In these embodiments, an input image 120 is processed in strips or sections. A first strip or section is analyzed 190 and the complexity of that strip or section is determined 192 using page-related features extracted from the input image 120. In these embodiments, page-related features include, but are not limited to, histogram analysis and transform domain processing. A cumulative page complexity measure 196 is stored 194. If the cumulative page complexity measure 196 exceeds a threshold value 198, global image enhancement 200 may be performed. If the cumulative page complexity measure 196 is less than the threshold value 198 and the entire document has not yet been processed 202, the next image strip or section is analyzed 190. The complexity of the next image strip or section is used to update 194 the cumulative page complexity measure 196 and this measure 196 is again compared to a threshold value 198. If the measure 196 exceeds the threshold value 198, global processing may be immediately performed for the entire image 200. If the threshold value is not exceeded 198, and the entire document has not yet been processed 202, another strip or section is processed as explained above.

This iterative process is continued until the threshold is exceeded 198 or the entire image is processed 202. If the entire image is processed without exceeding 198 the threshold value, the segmentation is performed on the entire image 204 and the image is enhanced using a segmentation-based enhancement 208. In some embodiments, a segmentation map 206 is used in this final segmentation-based process, however, the segmentation map does not need to be created unless the complexity measure 196 remains below the threshold value for the entire document.

In some embodiments of the present invention, an estimated complexity value may be used to adjust the level of enhancement that is applied to an input image. In these embodiments, the complexity value serves as a type of gain control and may determine how aggressively segmentation-based enhancement will be exercised. Rather than forcing a binary decision between two distinct types of enhancement (i.e., global vs. segmentation-based), the strength of the enhancement may be regulated. This may be performed on a continuous scale, on a step-wise basis or by some other adjustment scheme.

Typical embodiments may be described with reference to FIG. 13. In these embodiments, an input image 20 is analyzed and segmentation 220 is performed thereon whereby a segmentation map 222 is created. The complexity of the image is then measured 224 and a complexity value is determined 226. Based on this complexity value 226, a tuned enhancement may be performed 228 wherein the level of enhancement is varied according to the complexity value 226.

Adjustment of segmentation-based enhancement can be performed in various ways. FIG. 14 shows an exemplary embodiment comprising multiple filter types with different coefficients. These filters and coefficients may be utilized based on the value of the complexity estimate as shown.

Alternatively, the same set of enhancement filter coefficients can be modified based on the value of the complexity estimate $C_x$; for example, filter responses may be adjusted according to $C_x$, so that as document complexity increases, the filters tend to more conservative enhancement. In an alternative implementation, the complexity estimate can be used to combine the enhancement filter coefficients or enhancement results for various region types (e.g., text, halftone, etc.), to ensure that overaggressive processing is not applied to the input image.

In some previous embodiments of the present invention the complexity of a document has been defined for an entire image. In alternative embodiments, the complexity measure may be multi-valued. In some embodiments, the complexity measure may be represented by a vector whose components reflect the complexity of specific content regions in the segmentation map. Given the map, separate complexity values may be computed for individual regions, sets of regions or each of the detected regions. The resulting multi-valued complexity measure $C_x(1, 2, \ldots, M)$ may then be analyzed to determine the type and amount of enhancement that will be performed on each region.

When region-specific complexity values are determined, complexity may be computed differently for separate regions, using different sets of features. For example, in a document image, the complexity value for regions of halftone type may be based on the number of text pixels in the region, while on contone regions it may be determined using an entropy-like feature. It is thus possible to define the most appropriate complexity measures for the available region types, and apply segmentation-based enhancements in a more targeted way.

Some region-specific embodiments may be described with reference to FIG. 15. In these embodiments, an input image 20 is read and segmentation is performed thereon 240. This produces a segmentation map 242, which may be used to measure region-specific complexity values 244. A multi-valued complexity measure 246 results from these measurements. This multi-valued complexity measure may then be used to control or adjust region-specific enhancement 248 of the image.

In some cases, it may be desirable to utilize more than one segmentation method when estimating document complexity. One reason for employing multiple segmentation algorithms is that a single segmentation method may not work well for all kinds of input data. For example, a segmentation technique that relies on chromatic information may fail for an achromatic input image. An algorithm that is able to correctly classify halftone and text regions on a page but makes errors in contone areas is not optimal for segmenting scanned photographs. The complexity value computed using an inappropriate segmentation method will, in turn, lead to erroneous conclusions about what type of enhancement to apply.

To avoid such problems, an input image may first be segmented using a multiplicity of different segmentation methods. These methods may differ in the type of data or features that they utilize, the segmentation approach they follow, or both. For example, the same segmentation algorithm may be applied to each of the components of the input image separately. In another implementation, the input image may be segmented into its constituent regions using a clustering technique, a region growing technique, a fuzzy segmentation method, or other techniques or methods. After N distinct segmentation maps are generated by the segmentation module, a complexity value is computed for every map, yielding N complexity estimates for the input image. The best segmentation map (and, consequently, the segmentation method) for the given input image is then selected based on these complexity values.

Since complexity computations may take into account the error likelihoods of the segmentation methods, as well as the document layout, the resulting set of complexity values may provide an indication of which segmentation technique is the most appropriate for the image. The selection may be done in various ways. For example, the segmentation map that yields the minimum complexity estimate can be chosen for further enhancement.

Figure 16:
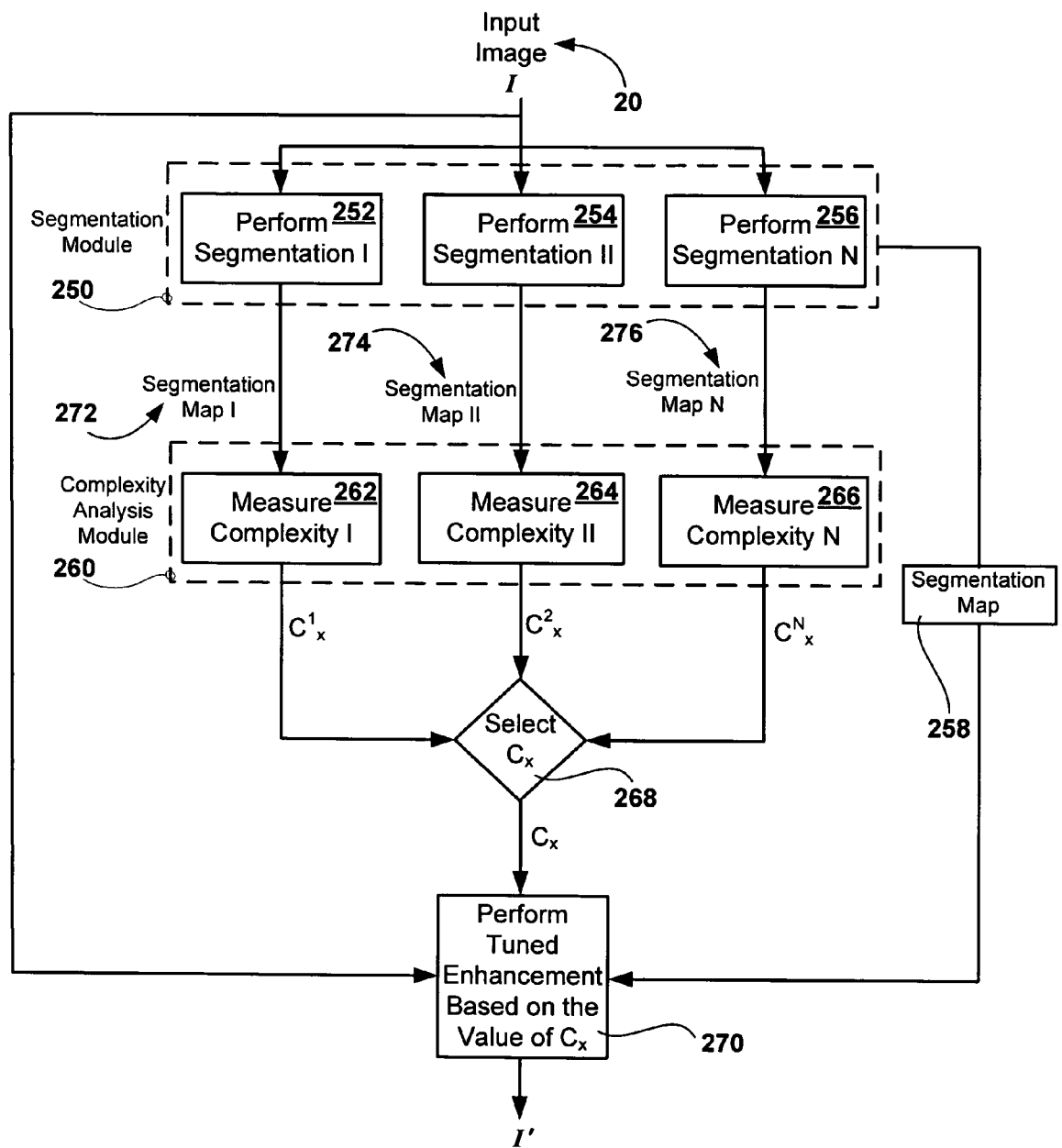
FIG. 16 is a diagram showing embodiments of the present invention that determine multiple complexity measures using multiple segmentation methods.

Some embodiments of the present invention that comprise multiple segmentation methods may be explained with reference to FIG. 16. In these embodiments, an input image 20 is received and multiple segmentation methods 252–256 are performed on the image 20. These methods result in the creation of multiple segmentation maps 272–276. Using these maps 272–276, the complexity of image 20 may be determined in relation to each of the segmentation methods 252–256. Multiple complexity values are determined 262–266 corresponding to each segmentation method 252–256. These complexity measures are analyzed to determine which segmentation method 252–256 will perform better for that particular image 20. Once a segmentation method is selected, the appropriate segmentation map 258 may be selected and used to perform a tuned enhancement 270 of the input image 20.

Figure 17:
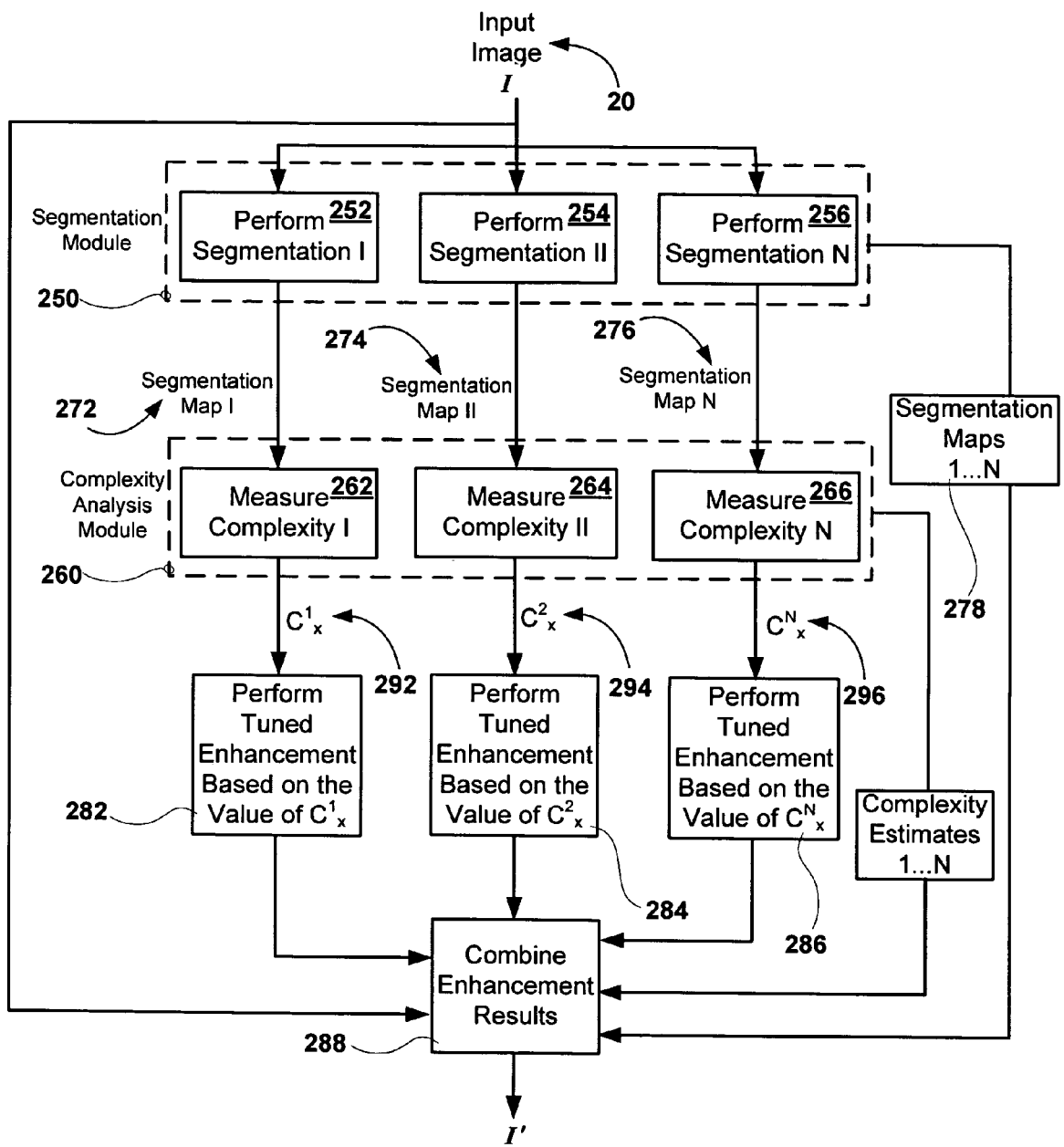
FIG. 17 is a diagram showing embodiments of the present invention that determine multiple complexity measures using multiple segmentation methods and perform multiple tuned enhancements, which may be combined into a final enhanced image.

Alternative embodiments of the multiple segmentation method approach may be described with reference to FIG. 17. In these embodiments, the input image 20 is enhanced using each of the alternative methods and the resulting images are combined to yield a single enhanced image.

Input image 20 is received and processed using multiple segmentation methods 252–256 thereby creating multiple segmentation maps 272–276, which are then used to measure 262–266 the complexity of the image relative to each segmentation method. This results in multiple complexity values 292–296 being generated. A tuned enhancement is then performed 282–286 on the image 20 according to each of the respective complexity measures 2962–2696. The result of each of the tuned enhancement methods 282–286 is then combined 288 to yield a single enhanced image.

In these embodiments, all of the maps obtained in the segmentation module 272–276 can be used to generate the final enhancement result 288. Tuned enhancement may be performed 282–286 for each of the segmentation maps 272–276, and the amount or type of enhancement in each case may be determined by the value of the corresponding complexity estimate 292–296. The enhancement results are then combined 288 to form the output image. The final merging step 288 may consider the complexity estimate 292–296 of each segmentation algorithm to determine how each enhancement result will contribute to the end result. In addition, particular properties of the segmentation techniques can be taken into account during merging, in order to exploit the strengths of each segmentation method.

Figure 18:
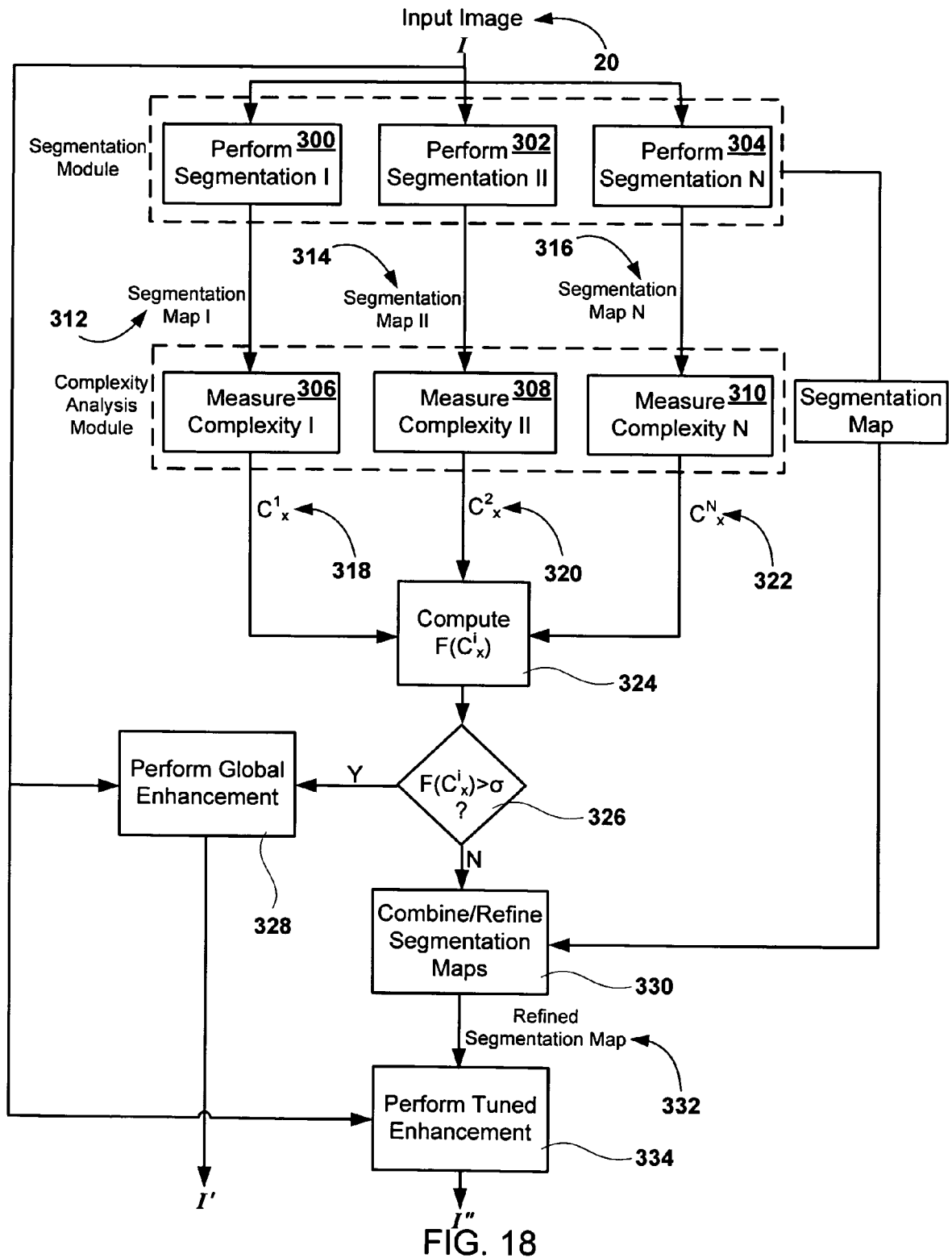
FIG. 18 is a diagram showing embodiments of the present invention that determine multiple complexity measures using multiple, initial, coarse segmentation methods.

In further embodiments, illustrated in FIG. 18, some of the maps obtained in the segmentation modules 300–304 can be used to generate a final segmentation map 330. In these embodiments, the complexity estimates 318–322 for the segmentation maps are combined using a function $F(C_x)$ 324. Among typical choices for the function $F(C_x)$ are min(.) and mean(.); clearly, other functions may also be used. If $F(C_x)$ exceeds 326 a given threshold σ, global enhancement 328 is applied to the input image. Otherwise, the segmentation maps are combined 330 to generate a refined segmentation map 332, and segmentation-based enhancement 334 is applied to the input image based on this final map. In some embodiments, only the most reliable segmentation maps with relatively low complexities may be merged to obtain the final segmentation. An additional step may be added, in some embodiments, where the complexity of the input document is re-estimated using the final segmentation, in order to determine whether segmentation-based enhancement is appropriate.

Many of the exemplary embodiments disclosed above typically rely explicitly on segmentation maps to estimate the complexity of document images. In some embodiments, the segmentation map is not needed to compute the complexity measure. In these embodiments, other features extracted directly from the input image may be utilized. These features may be derived from global image characteristics such as histograms; for example, smoothness or uniformity of the image histogram can be used as a simple indicator of document complexity. Alternatively, local features computed over pixel neighborhoods can provide the necessary complexity information. Such local features may include transform-based attributes determined in a block-based manner (e.g., magnitude of high-frequency transform DCT coefficients), uniformity measures (e.g., local variance), and others. These attributes can then be combined to determine a complexity estimate for an image. The complexity value may then be used to determine and adjust the type of enhancement that will be applied to the document or regions or sections thereof. In some of these embodiments, the enhancement may not be segmentation-driven; i.e., the same type enhancement, tuned according to the value of the complexity measure, may be applied to the entire document image. Tuning of enhancement parameters based on $C_x$ can be carried out in various ways as explained for other embodiments above.

A variety of document properties and segmentation-related features can be used to estimate the complexity of a document from its segmentation map. The particular set of features to be considered may vary according to the attributes of the particular segmentation algorithm that is used, as well as the requirements of the application. Certain content types may be computationally expensive and difficult to enhance for a given device or application; furthermore, enhancement errors committed on some regions may be more noticeable by users and, consequently, significantly more objectionable.

For example, a device may be able to efficiently process and enhance halftone areas, but may lack the ability to carry out similar improvements on continuous-tone regions. For such a device, an appropriate complexity measure may explicitly consider the prevalence of continuous-tone regions in the segmentation map. Additionally, some pixels may be assigned multiple labels during segmentation (e.g., text and halftone for text characters on a halftone backdrop); enhancement of such pixels may be especially hard to handle for enhancement algorithms. Therefore, complexity analysis needs to consider a large number of characteristics of the regions generated by the segmentation method (e.g., shape, area, topological properties, etc.) as possible features. Such features may include, but are not limited to, the number of foreground connected components; the number of non-rectangular connected components; the ratio of number of halftone pixels to the total number of pixels; the ratio of the number of halftone pixels in non-rectangular regions to the total number of pixels; the ratio of number of text pixels on halftone to the total number of pixels; luminance and/or chrominance statistics of the background and/or foreground regions, with or without text areas; and so on.

The computed features $f_i$ an subsequently be combined in a variety of ways to yield a single complexity measure $C_x$ for the entire document. In one embodiment, a weighted sum can be used to generate a scalar $C_x$:

$$C_x = \sum_{i=1}^{N} \omega_i f_i$$

where $\omega_i$ denote the weights for the features, and can be determined in a variety of ways (e.g., empirically, through regression analysis, etc.). Other embodiments can use different combination methods to obtain $C_x$ from the computed features.

Figure 19:
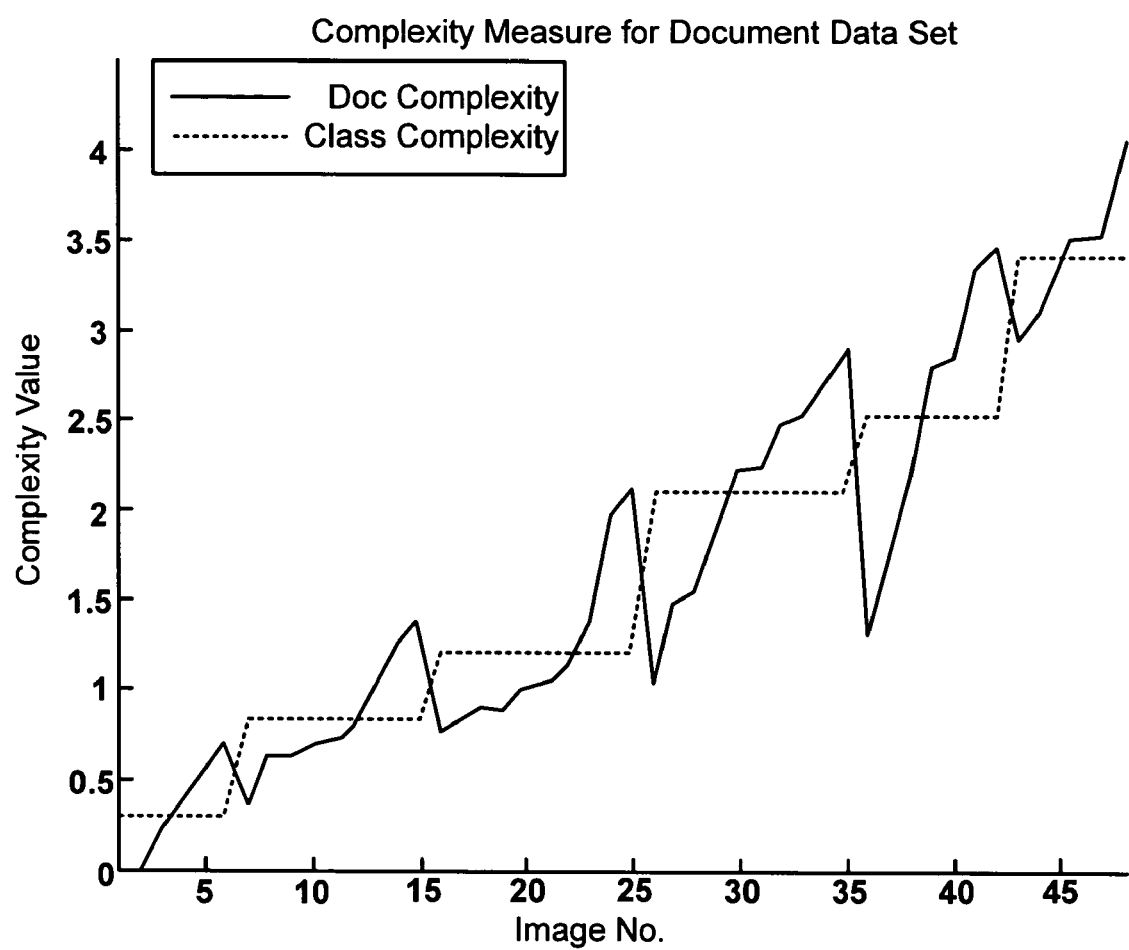
FIG. 19 is a chart showing calculated complexity measures plotted with a subjective complexity determination by human observers.

FIG. 19 illustrates the results of an example implementation of document complexity analysis for a sample set. The features used to compute document complexity in this particular embodiment are the number of foreground connected components; the number of non-rectangular connected components; the ratio of number of halftone pixels to the total number of pixels; the ratio of the number of halftone pixels in non-rectangular regions to the total number of pixels; and the ratio of number of text pixels on halftone to the total number of pixels. The feature values were then combined using a weighted sum to yield a single scalar complexity value $C_x$ for the input document. The documents in the test set were divided by human observers into 6 sets of equal complexity, and the automatically-computed complexity values were compared against the subjective ordering. As seen in FIG. 19, the computed complexity measure closely follows the subjective ordering, with discrepancies observed only at class boundaries.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for processing a digital image, said method comprising:
   a) dividing a non-object-based image data set into sections;
   b) performing segmentation on a section of said sections;
   c) estimating a complexity measure for said section based on the results of said segmentation;
   d) determining a cumulative complexity measure that represents the complexity of sections upon which segmentation has been performed;
   e) repeating steps b-d until all sections are segmented or until said cumulative complexity measure meets a criterion;

f) terminating said method and performing a first image enhancement process when said complexity measure meets said criterion; and g) performing a second image enhancement process when said complexity measure does not meet said criterion.

2. A method as described in claim 1 wherein said criterion is met when said complexity measure exceeds a threshold value.

3. A method as described in claim 1 wherein said first image enhancement process is global image enhancement.

4. A method as described in claim 1 wherein said second image enhancement process is segmentation-based image enhancement.

5. A method as described in claim 1 wherein said performing segmentation, said estimating a complexity measure and said determining a cumulative complexity measure are performed serially on said sections such that unnecessary processing of subsequent sections may be avoided once said cumulative complexity measure has met said criterion.

6. A method as described in claim 1 wherein said sections are processed in order of complexity based on an initial complexity estimate, which is determined before segmentation.

7. A method for processing a digital image, said method comprising:

a) dividing a digital image into sections;

b) obtaining process performance data for a plurality of image enhancement processes comprising a first image enhancement process and a second image enhancement process wherein said performance data relates to image complexity;

c) performing segmentation on a section of said sections;

d) estimating a complexity measure for said section based on the results of said segmentation and said process performance data;

e) determining a cumulative complexity measure that represents the complexity of sections upon which segmentation has been performed;

f) repeating steps c-e until all sections are segmented or until said cumulative complexity measure meets a criterion;

g) terminating said method and performing said first image enhancement process when said complexity measure meets said criterion; and h) performing said second image enhancement process when said complexity measure does not meet said criterion.

8. A method as described in claim 7 wherein said criterion is met when said complexity measure exceeds a threshold value.

9. A method as described in claim 7 wherein said first image enhancement process is global image enhancement.

10. A method as described in claim 7 wherein said second image enhancement process is segmentation-based image enhancement.

11. A method as described in claim 7 wherein said performing segmentation, said estimating a complexity measure and said determining a cumulative complexity measure are performed serially on said sections such that unnecessary processing of subsequent sections may be avoided once said cumulative complexity measure has met said criterion.

12. A method as described in claim 7 wherein said sections are processed in order of complexity based on an initial complexity estimate, which is determined before segmentation.

13. A method for processing a digital image, said method comprising:

a) dividing a non-object-based image data set into sections;

b) performing segmentation on a section of said sections;

c) obtaining process performance data for a plurality of image enhancement processes comprising a first image enhancement process and a second image enhancement process wherein said performance data relates to image complexity;

d) estimating a complexity measure for said section based on the results of said segmentation and said process performance data;

e) determining a cumulative complexity measure that represents the complexity of sections upon which segmentation has been performed;

f) repeating steps b-e until all sections are segmented or until said cumulative complexity measure meets a criterion;

g) terminating said method and performing said first image enhancement process when said complexity measure meets said criterion; and h) performing said second image enhancement process when said complexity measure does not meet said criterion.

14. An apparatus for processing of a digital image, said apparatus comprising:

a) a divider for dividing a non-object-based image data set into sections;

b) a segmenter for performing segmentation on a section of said sections;

c) an estimator for estimating a complexity measure for said section based on the results of said segmentation;

d) an accumulator for determining a cumulative complexity measure that represents the complexity of all sections upon which segmentation has been performed;

e) wherein said segmenter, said estimator and said accumulator perform their functions on subsequent sections until all sections are segmented or until said cumulative complexity measure meets a criterion;

f) a processor for performing a first image enhancement process when said complexity measure meets said criterion and for performing a second image enhancement process when said complexity measure does not meet said criterion.

15. An apparatus for selectively processing a digital image, said apparatus comprising:

a) a divider for dividing an image into sections;

b) a segmenter for performing segmentation on a section of said sections;

c) an estimator for estimating a complexity measure for said section based on the results of said segmentation;

d) an accumulator for determining a cumulative complexity measure that represents the complexity of all sections upon which segmentation has been performed;

e) wherein said segmenter, said estimator and said accumulator perform their functions on subsequent sections until all sections are segmented or until said cumulative complexity measure meets a criterion;

f) a processor for terminating said method and performing a first image enhancement process when said complexity measure meets said criterion and for performing a second image enhancement process when said complexity measure does not meet said criterion.

* * * * *